United States Patent
Durham et al.

(10) Patent No.: US 11,821,091 B2
(45) Date of Patent: Nov. 21, 2023

(54) SOLVENT-FREE PROCESSING OF LITHIUM LANTHANUM ZIRCONIUM OXIDE COATED-CATHODES

(71) Applicant: UCHICAGO ARGONNE, LLC, Chicago, IL (US)

(72) Inventors: Jessica L Durham, Frankfort, IL (US); Joseph A. Libera, Clarendon Hills, IL (US); Albert L Lipson, Forest Park, IL (US); Yujia Liang, Lisle, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/938,037

(22) Filed: Jul. 24, 2020

(65) Prior Publication Data
US 2022/0025502 A1   Jan. 27, 2022

(51) Int. Cl.
| | | |
|---|---|---|
| C23C 4/11 | (2016.01) | |
| H01M 4/04 | (2006.01) | |
| C23C 4/129 | (2016.01) | |
| H01M 4/02 | (2006.01) | |
| B05D 1/08 | (2006.01) | |
| B22F 10/20 | (2021.01) | |

(52) U.S. Cl.
CPC ............... *C23C 4/11* (2016.01); *C23C 4/129* (2016.01); *H01M 4/0402* (2013.01); *B05D 1/08* (2013.01); *B22F 10/20* (2021.01); *H01M 2004/028* (2013.01)

(58) Field of Classification Search
CPC ........ H01M 4/0404; C23C 4/11; C23C 4/129; B05D 1/08; B22F 10/20

USPC ......................................................... 427/453
See application file for complete search history.

(56) References Cited

U.S. PATENT DOCUMENTS

| | | | |
|---|---|---|---|
| 5,851,696 A * | 12/1998 | Saidi ..................... | H01M 4/505 |
| | | | 429/231.2 |
| 7,211,236 B2 | 5/2007 | Stark et al. | |
| 8,753,601 B2 | 6/2014 | Stark et al. | |
| 10,333,123 B2 * | 6/2019 | Thokchom .......... | H01M 4/5825 |
| 10,818,968 B2 * | 10/2020 | Kim ..................... | H01M 10/052 |
| 2011/0053001 A1 * | 3/2011 | Babic ................. | C04B 35/6264 |
| | | | 429/322 |
| 2011/0150737 A1 | 6/2011 | Stark et al. | |
| 2017/0207456 A1 * | 7/2017 | Liu ...................... | H01M 4/525 |
| 2019/0036159 A1 * | 1/2019 | Kim ..................... | H01M 4/525 |
| 2019/0051934 A1 * | 2/2019 | Kim ................... | H01M 10/0562 |
| 2019/0386311 A1 * | 12/2019 | Bauer .................... | H01M 4/62 |
| 2020/0044281 A1 | 2/2020 | Zhu et al. | |
| 2020/0373552 A1 * | 11/2020 | Albano .............. | H01M 4/0416 |
| 2020/0392014 A1 * | 12/2020 | Libera .................. | C01G 25/006 |
| 2020/0403269 A1 | 12/2020 | Zhu et al. | |

(Continued)

FOREIGN PATENT DOCUMENTS

WO   WO-2021/048249 A1   3/2021

OTHER PUBLICATIONS

Adachi, et al., "Fast Li? Conducting Ceramic Electrolytes," Advanced Materials 8(2), pp. 127-135 (1996).

(Continued)

*Primary Examiner* — Brian K Talbot
(74) *Attorney, Agent, or Firm* — FOLEY & LARDNER LLP

(57) ABSTRACT

A dry process for coating Ni-rich cathode powder with cubic LLZO powder prepared by flame spray pyrolysis.

10 Claims, 10 Drawing Sheets

(56) References Cited

U.S. PATENT DOCUMENTS

| | | | |
|---|---|---|---|
| 2021/0198117 A1* | 7/2021 | Durham | C01G 25/02 |
| 2021/0253440 A1 | 8/2021 | Daemen et al. | |
| 2021/0305568 A1* | 9/2021 | Kanada | H01M 4/38 |
| 2021/0399331 A1* | 12/2021 | Sakamoto | H01M 10/056 |
| 2022/0006071 A1* | 1/2022 | Petrowsky | H01M 10/0565 |
| 2022/0025502 A1 | 1/2022 | Durham et al. | |
| 2022/0336841 A1* | 10/2022 | Schäfer | C01G 25/006 |
| 2023/0102140 A1* | 3/2023 | Zhang | H01M 10/056 |
| | | | 429/316 |

OTHER PUBLICATIONS

Buesser & Pratsinis, "Design of Nanomaterial Synthesis by Aerosol Processes," Annual Review of Chemical and Biomolecular Engineering 3, pp. 103-127 (2012).

Chen, et al., "A study of suppressed formation of low-conductivity phases in doped Li7La3Zr2O12 garnets by in situ neutron diffraction," Journal of Materials Chemistry A 3(45), pp. 22868-22876 (2015).

Deng, et al., "Structure and electrochemical performance of spinel LiMn1.95Ni0.05O3.98F0.02 coated with Li—La—Zr—O solid electrolyte," Journal of Solid State Electrochemistry 18, pp. 249-255 (2014).

Geiger, et al., "Crystal Chemistry and Stability of 'Li7La3Zr2O12' Garnet: A Fast Lithium-Ion Conductor," Inorganic Chemistry 50(3), pp. 1089-1097 (2011).

Gordon, et al., "Preparation of Nano- and Microstructured Garnet Li7La3Zr2O12 Solid Electrolytes for Li-Ion Batteries via Cellulose Templating," ACS Sustainable Chemistry & Engineering 4(12), pp. 6391-6398 (2016).

Gurav, et al., "Aerosol Processing of Materials," Aerosol Science and Technology 19(4), pp. 411-452 (1993).

Heo, et al., "Enhanced Electrochemical Performance of Ionic-Conductor Coated Li[Ni0.7Co0.15Mn0.15]O2,"Journal of the Electrochemical Society 164(12), pp. A2398-A2402 (2017).

Jin & McGinn, "Al-doped Li7La3Zr2O12 synthesized by a polymerized complex method," Journal of Power Sources 196(20), pp. 8683-8687 (2011).

Kelesidis, et al., "Flame synthesis of functional nanostructured materials and devices: Surface growth and aggregation," Proceedings of the Combustion Institute 36(1), pp. 29-50 (2017).

Koirala, et al., "Synthesis of catalytic materials in flames: opportunities and challenges,"Chemical Society Reviews 45(11), pp. 3053-3068 (2016).

Kokal, et al., "Sol-gel synthesis and lithium ion conductivity of Li7La3Zr2O12 with garnet-related type structure," Solid State Ionics 185(1), pp. 42-46 (2011).

Kotobuki & Koishi, "Influence of precursor calcination temperature on sintering and conductivity of Li1.5Al0.5Ti1.5(PO4)3 ceramics," Journal of Asian Ceramic Societies 7(1), pp. 69-74 (2019).

Lamoreaux & Hildenbrand, "High Temperature Vaporization Behavior of Oxides. I. Alkali Metal Binary Oxides," Journal of Physical and Chemical Reference Data 13, pp. 151-173 (1984).

Lenggoro, et al., "An experimental and modeling investigation of particle production by spray pyrolysis using a laminar flow aerosol reactor," Journal of Materials Research 15(3), pp. 733-743 (2000).

Liang, et al., "Colloidal spray pyrolysis: A new fabrication technology for nanostructured energy storage materials," Energy Storage Materials 13, pp. 8-18 (2018).

Liang, et al., "Cu—Sn binary metal particle generation by spray pyrolysis," Aerosol Science and Technology 51(3), pp. 430-442 (2017).

Madler, et al., "Controlled synthesis of nanostructured particles by flame spray pyrolysis," Journal of Aerosol Science 33(2), pp. 369-389 (2002).

Mentus, et al., "Lanthanum nitrate decomposition by both temperature programmed heating and citrate gel combustion," Journal of Thermal Analysis and Calorimetry 90, pp. 393-397 (2007).

Michalow-Mauke, et al., "Flame-Made WO3/CeOx-TiO2 Catalysts for Selective Catalytic Reduction of NOx by NH3," ACS Catalysis 5(10), pp. 5657-5672 (2015).

Murugan, et al., "Fast Lithium Ion Conduction in Garnet-Type Li7La3Zr2O12," Angewandte Chemie 46(41), pp. 7778-7781 (2007).

Park, et al., "Electrochemical Properties of Composite Cathode Using Bimodal Sized Electrolyte for All-Solid-State Batteries," Journal of the Electrochemical Society 166(3), pp. A5318-A5322 (2019).

Rangasamy, et al., "The role of Al and Li concentration on the formation of cubic garnet solid electrolyte of nominal composition Li7La3Zr2O12," Solid State Ionics 206, pp. 28-32 (2012).

Ren, et al., "Chemical compatibility between garnet-like solid state electrolyte Li6.75La3Zr1.75Ta0.25O12 and major commercial lithium battery cathode materials," Journal of Materiomics 2(3), pp. 256-264 (2016).

Ren, et al., "Oxide Electrolytes for Lithium Batteries," Journal of the American Ceramic Society 98(12), pp. 3603-3623 (2015).

Sakamoto, et al., "Synthesis of nano-scale fast ion conducting cubic Li7La3Zr2O12," Nanotechnology 24(42), 8 pages (213).

Samson, et al., "A bird's-eye view of Li-stuffed garnet-type Li7La3Zr2O12 ceramic electrolytes for advanced all-solid-state Li batteries," Energy & Environmental Science 12(10), pp. 2957-2975 (2019).

Schnell, et al., "Prospects of production technologies and manufacturing costs of oxide-based all-solid-state lithium batteries," Energy & Environmental Science, 12(6), pp. 1818-1833 (2019).

Sharafi, et al., "Impact of air exposure and surface chemistry on Li-Li7La3Zr2O12 interfacial resistance," Journal of Materials Chemistry A 5(26), pp. 13475-13787 (2017).

Shimonishi, et al., "Synthesis of garnet-type Li7-xLa3Zr2O12-1/2x and its stability in aqueous solutions," Solid State Ionics 183(1), pp. 48-53 (2011).

Stern, "High Temperature Properties and Decomposition of Inorganic Salts Part 3, Nitrates and Nitrites," Journal of Physical and Chemical Reference Data 1, pp. 747-772 (1972).

Wang, et al., "Experimental study and thermodynamic modelling of the ZrO2-LaO1.5 system," Calphad 32(1), pp. 111-120 (2008).

Wu, et al., "Utmost limits of various solid electrolytes in all-solid-state lithium batteries: A critical review," Renewable and Sustainable Energy Reviews 109, pp. 367-385 (2019).

Xu, et al., "Multistep sintering to synthesize fast lithium garnets," Journal of Power Sources 302, pp. 291-297 (2016).

Yi, "Aerosol Combustion Synthesis of Nanopowders and Processing to Functional Thin Films," Ph.D. Thesis, University of Michigan Horace H. Rackham School of Graduate Studies, 97 pages (2017).

Yi, et al., "Flame made nanoparticles permit processing of dense, flexible, Li conducting ceramic electrolyte thin films of cubic-Li7La3Zr2O12 (c-LLZO)," Journal of Materials Chemistry A 4(33), pp. 12947-12954 (2016).

Yi, et al., "Key parameters governing the densification of cubic-Li7La3Zr2O12 Li conductors," Journal of Power Sources 352, pp. 156-164 (2017).

Zhang, et al., "Mechanism Study on the Interfacial Stability of a Lithium GarnetType Oxide Electrolyte against Cathode Materials," ACS Applied Energy Materials 1(11), pp. 5968-5976 (2018).

Zhao, et al., "Particle size distribution function of incipient soot in laminar premixed ethylene flames: effect of flame temperature," Proceedings of the Combustion Institute 30(1), pp. 1441-1448 (2005).

Djenadic, et al., "Nebulized spray pyrolysis of Al-doped Li7La3Zr2O12 solid electrolyte for battery applications," Solid State Ionics 263, pp. 49-56 (2014).

\* cited by examiner

SOLVENT-FREE PROCESSING OF LITHIUM LANTHANUM ZIRCONIUM OXIDE COATED-CATHODES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates to processing methods. More particularly, the present disclosure relates to systems, methods, and compositions for nickel-rich cathodes coated with cubic phase, aluminum-doped lithium lanthanum zirconium oxide.

BACKGROUND

Higher energy density Ni-rich $LiNi_xMn_yCo_zO_2$ ("NMC") cathodes have a poor cycle life and safety concerns due to increased interfacial instability at the surface of high Ni content material in contact with the electrolyte. The poor cycle life of Ni-rich cathodes limits their application in electric vehicles. There are reports in which additives are utilized in the electrolyte to form a more stable solid electrolyte interphase ("SEI") upon cycling. Alternatively, various coating or dopant species are applied to the Ni-rich cathode to stabilize the surface. Another option is to modify the Ni-rich precursor during synthesis to achieve a lower Ni content shell or gradient on the surface of the Ni-rich cathode. All of these techniques have various tradeoffs in cost and performance of the final cathode.

The solid state electrolyte lithium lanthanum zirconium oxide ($Li_7La_3Zr_2O_{12}$ or "LLZO") can be useful as a protective coating on electrically conductive material, such as cathodes. Further, the LLZO coating is useful in cathode architectures for solid state batteries where intimate contact with the ionically conducting electrolyte will help improve performance. However, prior applications of LLZO coatings on cathode materials required a high temperature (at least 1000° C.) and an aggressive mechanical process to reduce the size of LLZO particles prior to distributing it on the surface of the cathode or utilized a liquid-mediated process, such as solution processing or sol-gel. The resultant LLZO coating layers are normally amorphous with limited Li-ion diffusion coefficient.

Thus, there remains a need for a lower temperature, such as less than 700° C., solid state process for generating a desired thickness of LLZO on cathode materials.

SUMMARY

One embodiment relates to a Ni-rich cathode that has been coated with aluminum-doped LLZO solid state electrolyte to improve electrochemical performance. The aluminum-doped LLZO is unique in the fact that it was synthesized from an Al-doped LLZO precursor manufactured using flame spray pyrolysis and calcined at low temperature (i.e., less than 700° C.) to achieve the electrochemically preferred, ionically conductive cubic phase. This material provides an advantage over other LLZO materials available due to the small, micron- or sub-micron-sized particles generated. This allows a uniform coating to be formed on the NMC materials via gentle ball milling that does not substantially damage the cathode particles.

Another embodiment relates to a flame spray pyrolysis method followed by a calcination step to form a doped LLZO powder. A nickel-containing lithium cathode material is mixed with the doped LLZO powder, wherein the nickel containing lithium cathode material retains a particle size of at least 6 microns, in one embodiment at least 10 microns, forming a LLZO-cathode material mixture of 90-99.9 wt % solid nickel containing lithium cathode material and 0.1-10 wt % solid LLZO. The LLZO-cathode material mixture is calcined.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
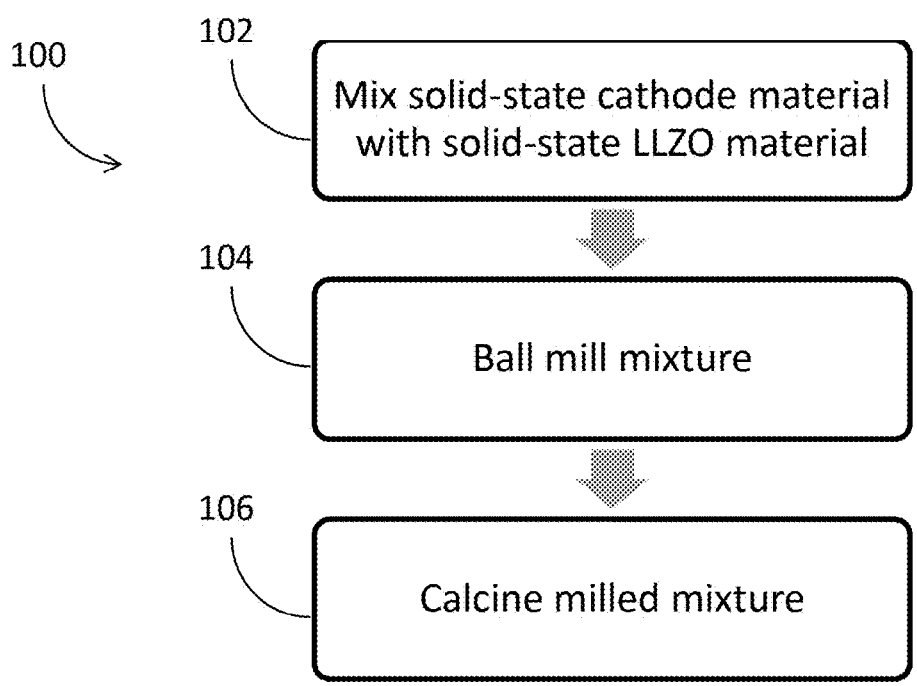
FIG. 1 is a flow chart illustrating a dry method of coating Ni-rich NMC811 cathode powder with LLZO.
Figure 2:
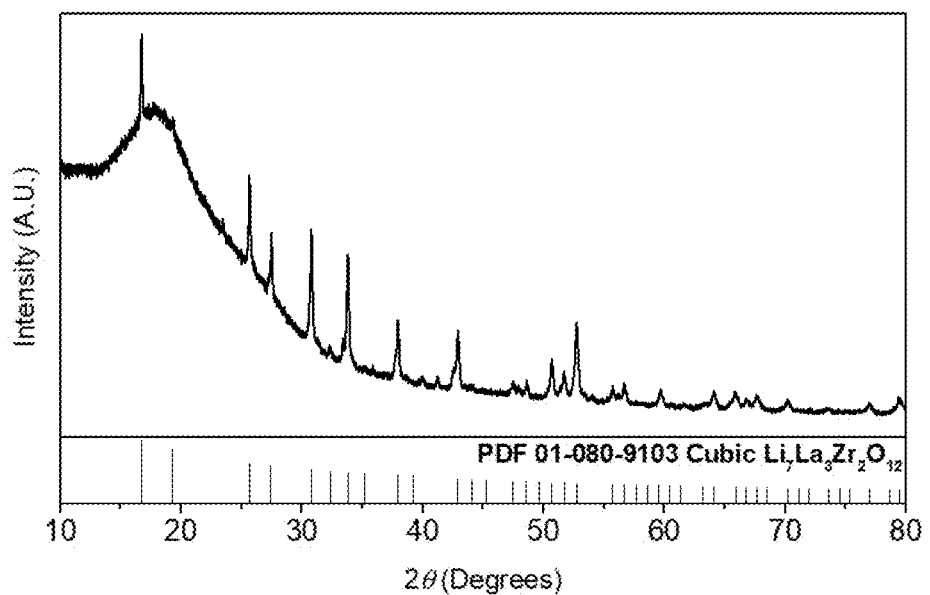
FIG. 2 shows X-ray diffraction ("XRD") of cubic Al-doped LLZO used to coat Ni-rich NMC811 cathode.
Figure 3:
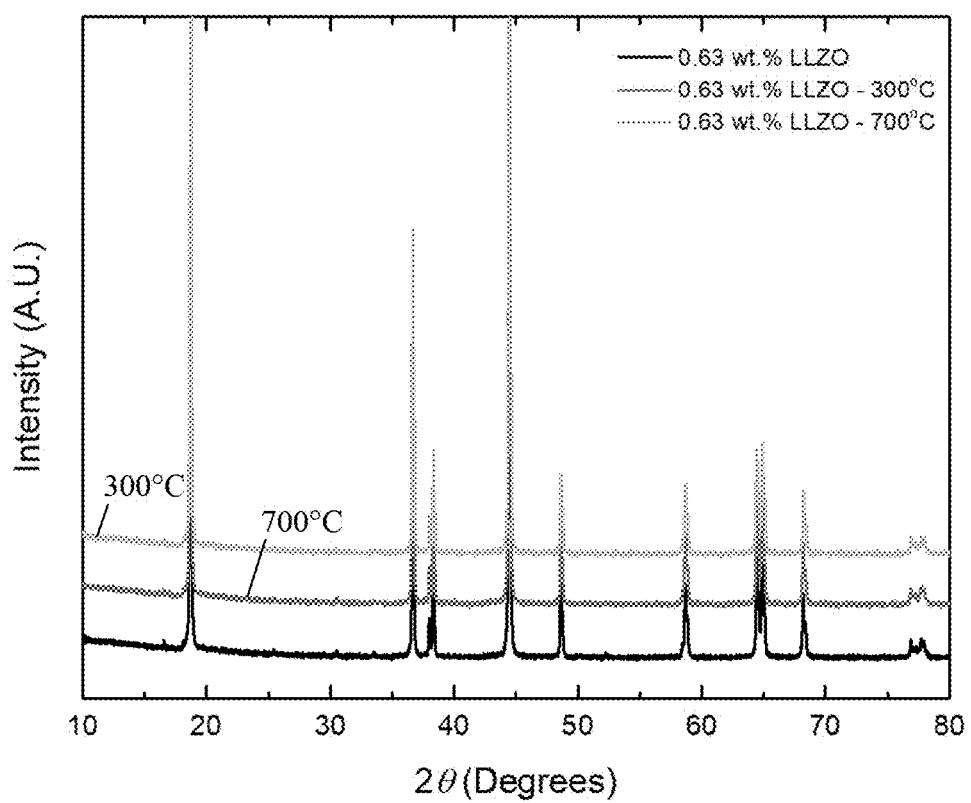
FIG. 3 shows XRD of pristine, heat treated, and LLZO-coated NMC811 materials.
Figure 4:
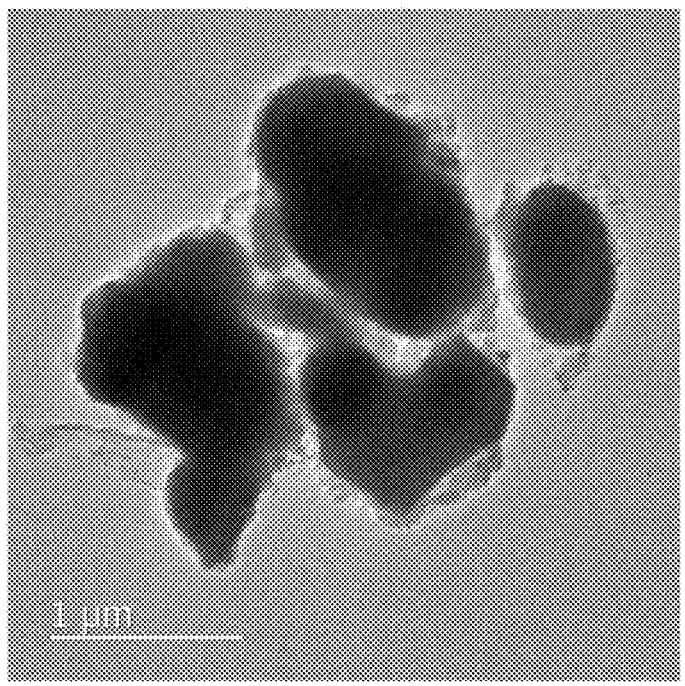
FIG. 4 shows a transmission electron microscopy ("TEM") image of cubic Al-doped LLZO powder used to coat NMC811.
Figure 5A:
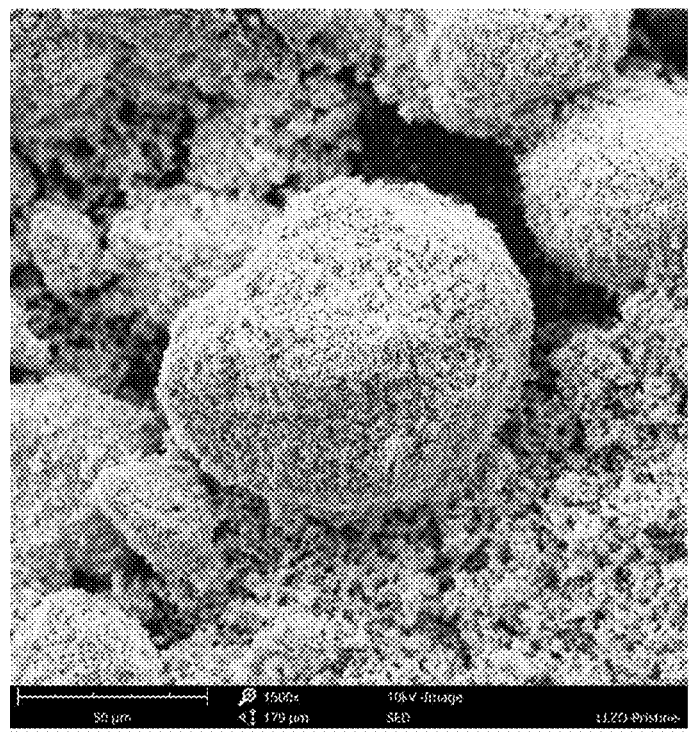
FIGS. 5A and 5B show scanning electron microscopy ("SEM") images of a bulk sample of cubic Al-doped LLZO powder used to coat NMC811 at different magnifications.
Figure 5B:
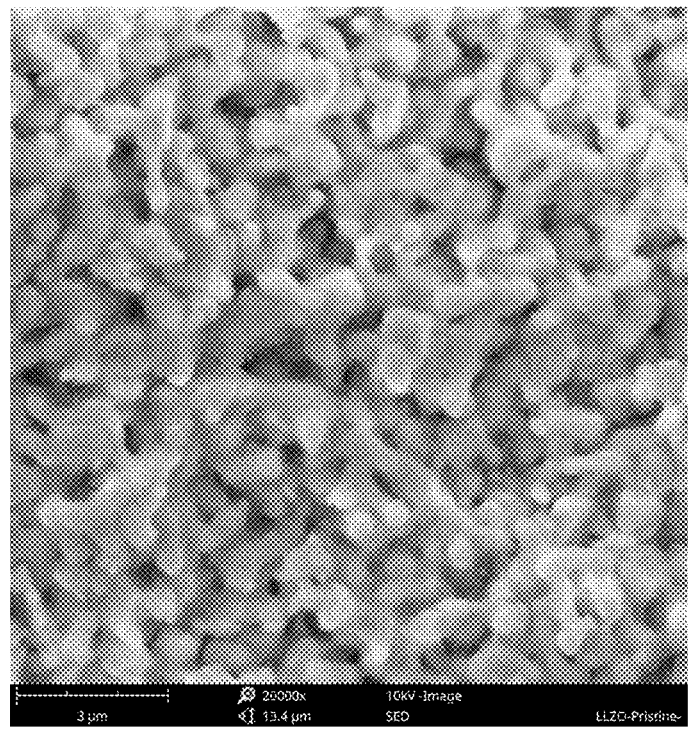
Figure 6A:
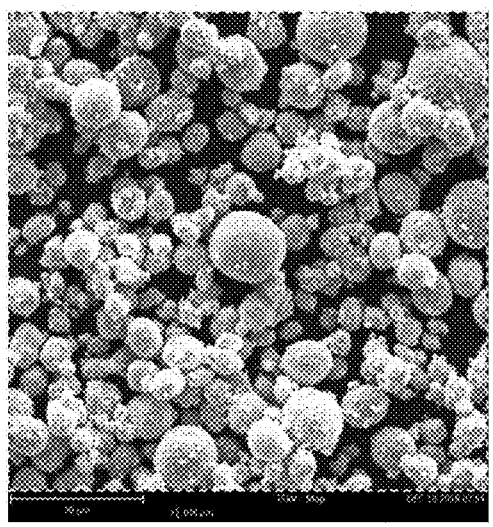
FIG. 6A shows a SEM image of a bulk sample of LLZO-coated NMC811 cathode material.
Figure 6B:
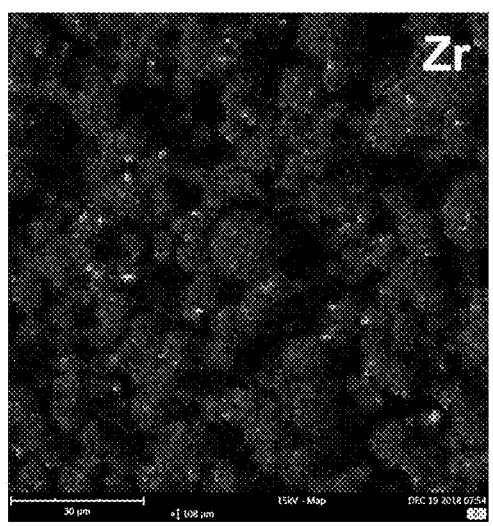
FIG. 6B shows energy dispersive X-ray spectroscopy ("EDS") mapping of zirconium across the particles.
Figure 6C:
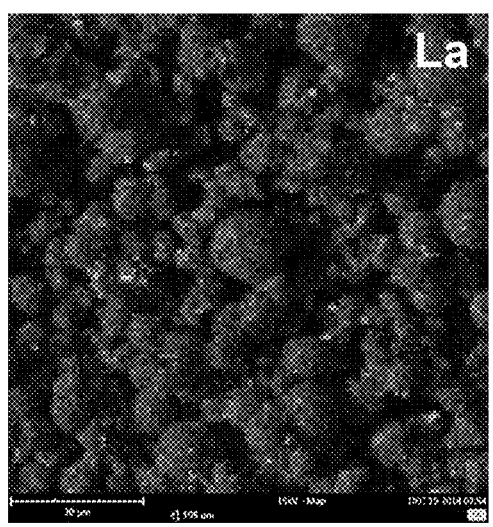
FIG. 6C shows an EDS map of lanthanum.
Figure 7A:
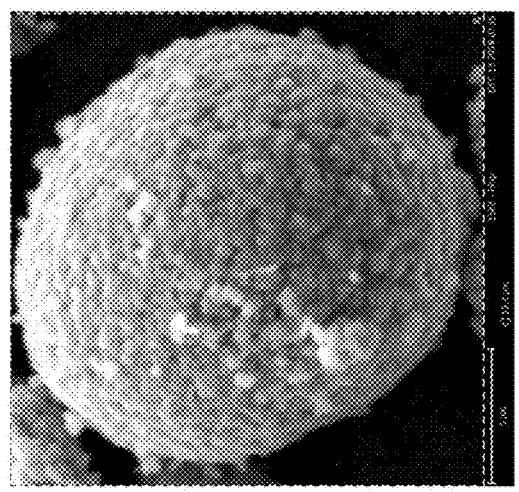
FIG. 7A shows an SEM image of an LLZO-coated NMC811 cathode particle.
Figure 7D:
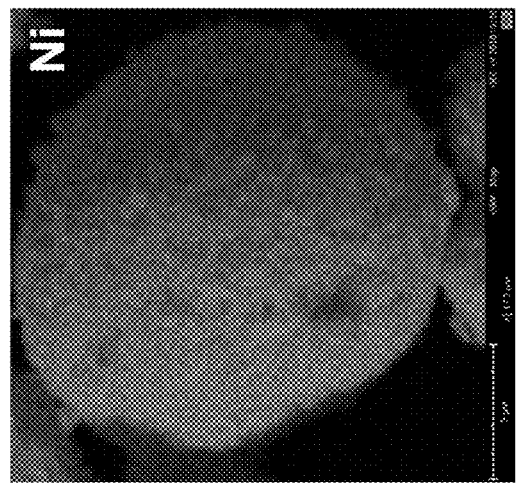
FIG. 7D shows an EDS map of nickel.
Figure 7C:
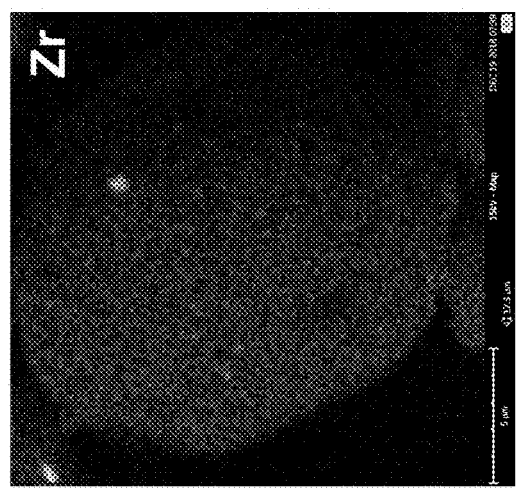
FIG. 7C shows an EDS map of zirconium.
Figure 7B:
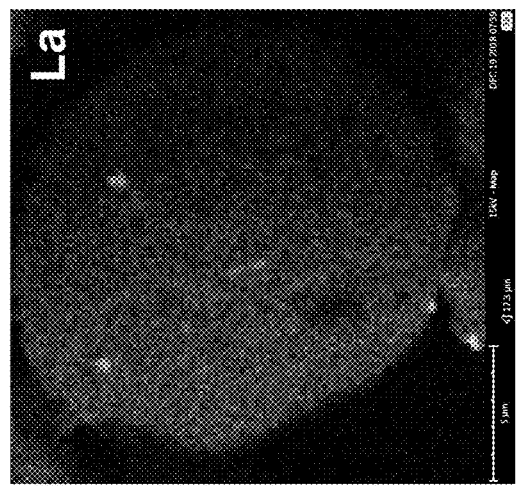
FIG. 7B shows EDS mapping of lanthanum across the particle.
Figure 7G:
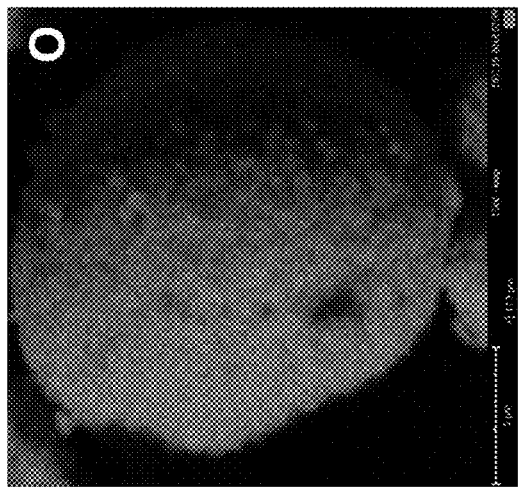
FIG. 7G shows an EDS map of oxygen.
Figure 7F:
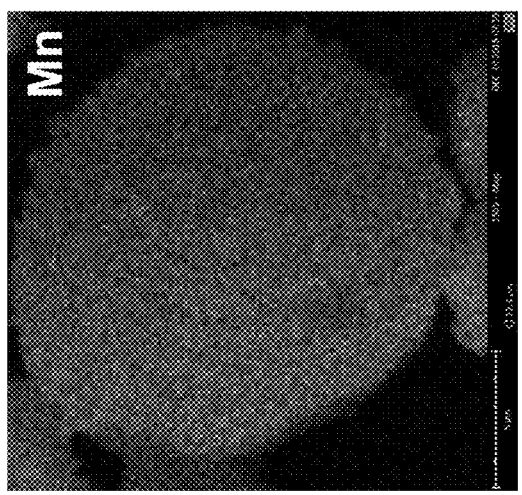
FIG. 7F shows an EDS map of manganese.
Figure 7E:
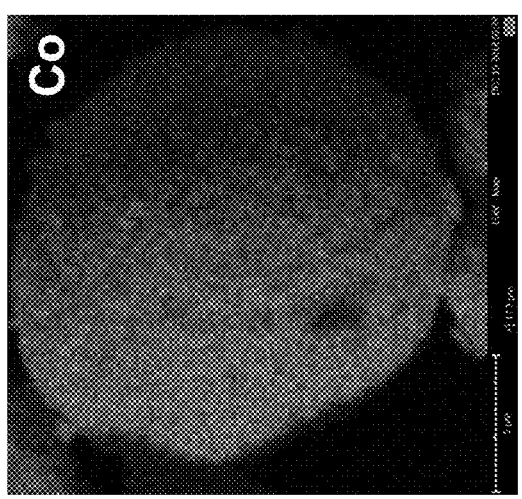
FIG. 7E shows an EDS map of cobalt.
Figure 7H:
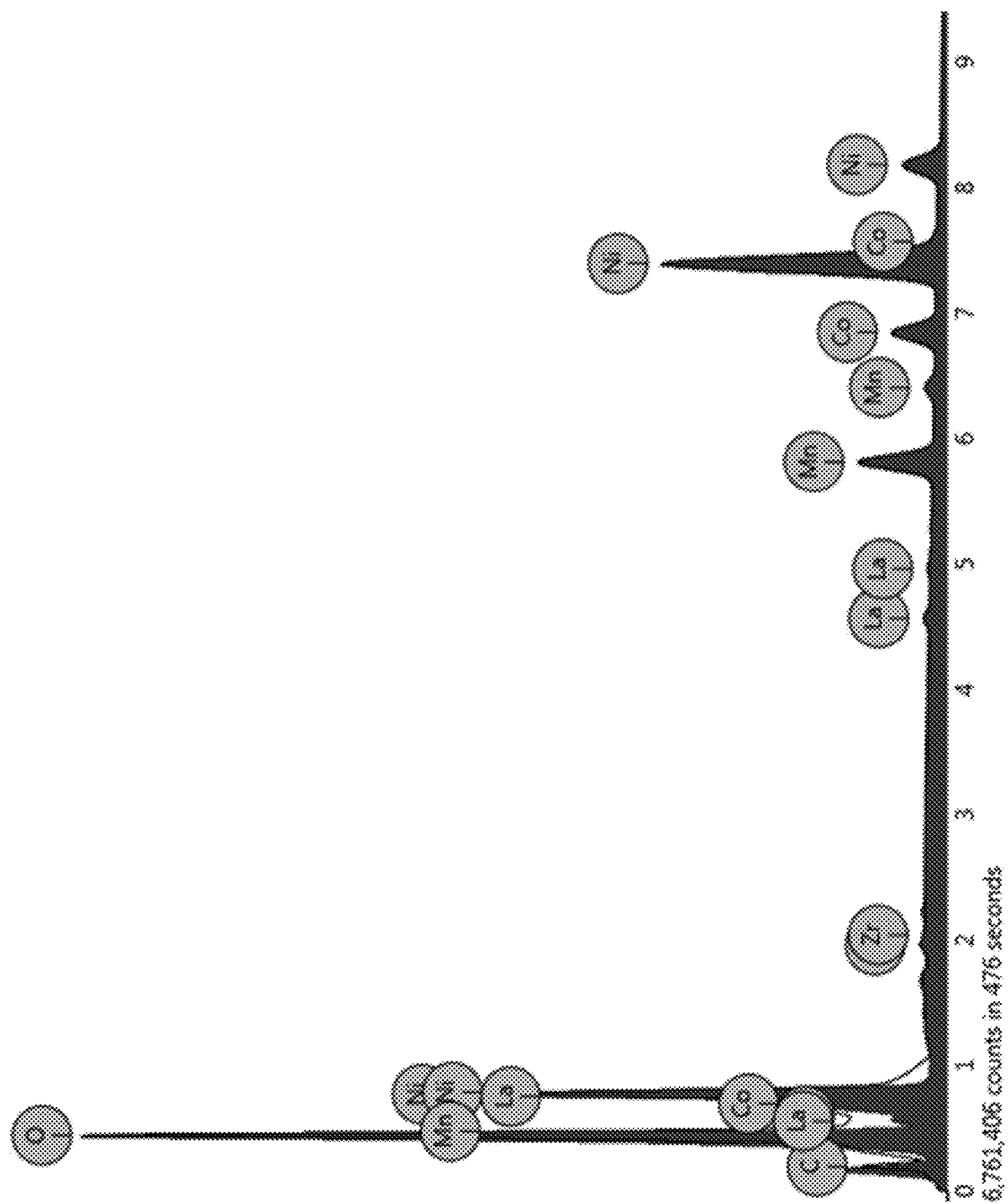
FIG. 7H is an EDS spectrum of the mapped area showing the relative intensity of present elements as a function of their characteristic x-ray emission energy (keV).

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The published literature establishes that the cubic phase of LLZO (specifically, $Li_7La_3Zr_2O_{12}$) is the desired phase as it provides a very high lithium ion conductivity while maintaining very low electronic conductivity. However, temperatures near 1000° C. are often used in the literature to obtain this phase. Thermodynamically, the tetragonal phase is stable at low temperatures and the cubic phase is stable at high temperatures. A dopant is used to stabilize the cubic phase at low temperatures. Without a dopant, the cubic phase that forms at high temperatures would revert to tetragonal upon cooling from synthesis temperatures. Previous work has shown that aluminum and gallium are successful at stabilizing the cubic phase of LLZO. Annealing remains critical for applications that require dense solid state electrolyte material for energy storage applications. Apart from the efficiency of being able to anneal at lower temperature (sub-1000° C., including sub-800° C.), a far more important feature is that the material could be co-sintered with active cathode phases such as NMC811 or LCO without requiring those materials to be subjected to the higher temperature such as 1000° C. which could destroy the required layered phase for those materials. Typically, temperatures of 700-850° C. are used to prepare layered cathode phases, so cubic LLZO synthesis falling into this window would match thermal budgets for both materials. Co-sintering is a potential manufacturing strategy for making cathode/solid-state electrolyte architectures for all solid state batteries.

The advantages of creating a coating of micron or sub-micron LLZO materials on the surface of an NMC cathode include a uniform coating layer on the cathode particles, thin coating layer, and low co-sintering temperature. In terms of electrochemical performance, a uniform coating can lead to an even distribution of Li-ions over the NMC particles and ease the mechanical stress of during lithium ion insertion/extraction. A thin coating layer can minimize effects due to electrochemical inactivity of LLZO and improve energy density. A low co-sintering temperature (i.e., less than 700° C.) can suppress the lithium loss during the sintering process and allow the crystal structures of NMC and LLZO to remain intact. One embodiment, utilizes flame spray pyrolysis based LLZO particles such as disclosed in U.S. Provisional App. No. 62/861,898, incorporated herein by reference. The green powder synthesized by flame spray pyrolysis and sintered below 700° C. yields Al-doped LLZO which consists of secondary particles where the primary particle size is between 200 nanometers to 1 micrometer. The calcination temperature of the flame spray pyrolysis-based material is low enough to suppress the growth of large primary grain structures while also preventing the sintering or fusing together of primary particles in the final Al-doped LLZO product.

In one embodiment, the resultant Al-doped LLZO can be applied as an ionically conductive coating on an electrode material. For example, the Al-doped LLZO may be mixed with a layered, Ni-rich cathode material where the nickel content is 60% or greater by elemental composition, such as NMC811 material. The LLZO and Ni-rich cathode is then ball milled using conditions that will not reduce the size of the 10-15 µm cathode particles and keep the structure intact. A combination of the flame spray pyrolysis synthesis method and low temperature calcination, which resulted in smaller grains and less sintering between primary particles, makes the Al-doped LLZO unique and enables the facile reduction of the secondary particle morphology to smaller micron or sub-micron particles during a mild ball milling procedure. The mixing can be performed in a high-energy ball mill, such as a planetary ball mill, where the weight ratio of grinding media to NMC/LLZO powder is 1:1 with approximately 80% void space in the milling yttria-stabilized zirconia milling vessel. To prevent significant size reduction from occurring, yttria-stabilized zirconia sphere grinding media with diameters of 5 mm or greater is preferred to reduce active milling surface area. Grinding time in the planetary ball mill can range between 5 and 90 minutes such that the cathode particles are not broken down in the time frame. In this embodiment, mixing is performed dry (i.e., no addition of solvent) under ambient conditions.

After ball milling, the mixture is heat treated within a temperature range of 300-800° C. to induce some amount of interaction between the LLZO coating and Ni-rich cathode material. The scanning electron microscopy images illustrate that LLZO is uniformly dispersed throughout the bulk sample with no discernible micron-sized secondary or primary particle morphology of LLZO present. This suggests that thin layer coating of LLZO is in intimate contact with the surface of the NMC cathode particles. At temperatures at or above 300° C., the thin coating allows for sufficient diffusion to create a bond between the coating and NMC without substantial mixing of the two materials. The interfacial quality between the coating and cathode material improves at higher temperatures (i.e., above 500° C.) which suggests that diffusion may play an additional role in reducing the evidence of the LLZO micron-sized morphology. For Ni-rich cathode materials, calcination takes place under an atmosphere of flowing oxygen.

Experiments

LLZO-Coated Cathodes

In one embodiment, shown as method 100 in FIG. 1, a cubic-phase LLZO material is coated on a nickel containing cathode material. The LLZO may include dopants (e.g., aluminum, tantalum, yttrium, iron, tellurium, tungsten, niobium, barium, cerium, titanium, boron, antimony, and gallium), where a dopant replaces about 3-50 mol % of the Li or Zr in $Li_7La_3Zr_2O_{12}$. The nickel-containing cathode may, in one embodiment, comprise a $LiNi_xCo_yMn_zO_2$ material, where x plus y plus z equals 1, and in a further embodiment, where x is 60% or greater.

At step 102, in one embodiment, solid-state LLZO, such as that prepared above using flame spray pyrolysis ("FSP"), is combined with solid cathode material to form a mixture. The mixture includes 90-99.9 wt % of the solid cathode material and 0.1-10 wt % of the solid state LLZO, for example 99.37 wt % cathode material and 0.63 wt % LLZO, which may be doped LLZO.

At 104, the mixture is ball milled to combine LLZO powder with the cathode material such that a uniformly dispersed LLZO coating is achieved without fracturing or reducing the size of 6-15 μm cathode material. The milling may utilize a planetary ball mill. The milling may be done at 50-300 RPM for 5-90 minutes. In one embodiment, the ball milling is done at 300 RPM for 15 minutes using 10 mm yttria-stabilized zirconia balls for the ball milling.

The milled mixture is then calcined at step 106. In one embodiment, the calcination occurs under an atmosphere of flowing oxygen to prevent the reactive surfaces of the LLZO or Ni-rich powder from reacting with carbon dioxide from the atmosphere, which will produce carbonate impurities on the surfaces. In one embodiment, the calcination occurs between 300° C. and 800° C., such as at 300° C. or 700° C. for 1-10 hours.

Figure 8:
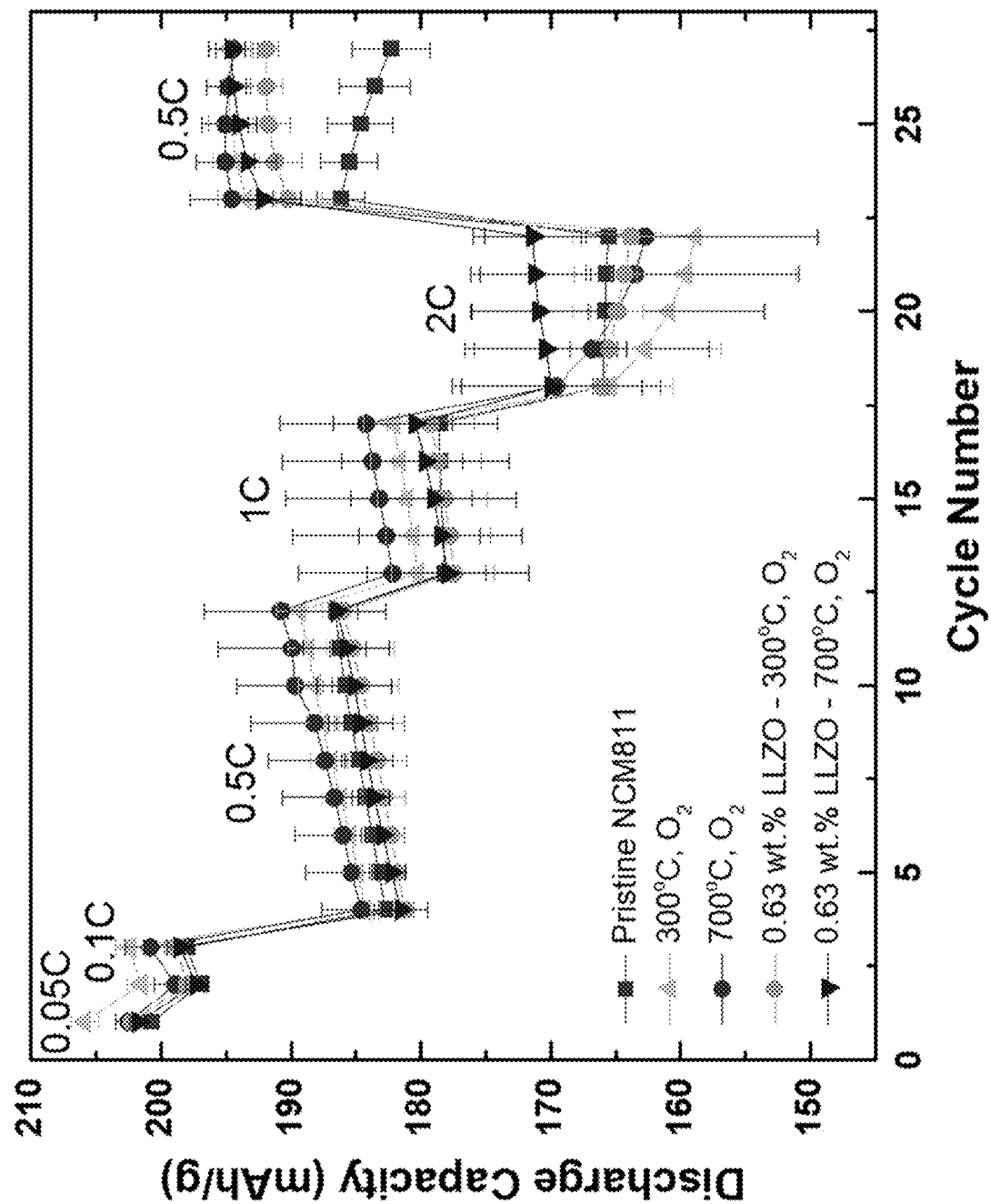
FIG. 8 is a graph of the electrochemical rate performance for a series of pristine, heat treated, and LLZO-coated NMC811. The data was collected in half-cells with lithium metal anodes according to the following: laminate formulation of 93/4/3 (active/carbon/binder), 1 C=200 mA/g, commercial electrolyte, and potential window of 3.0-4.3V at 30° C.
Figure 9:
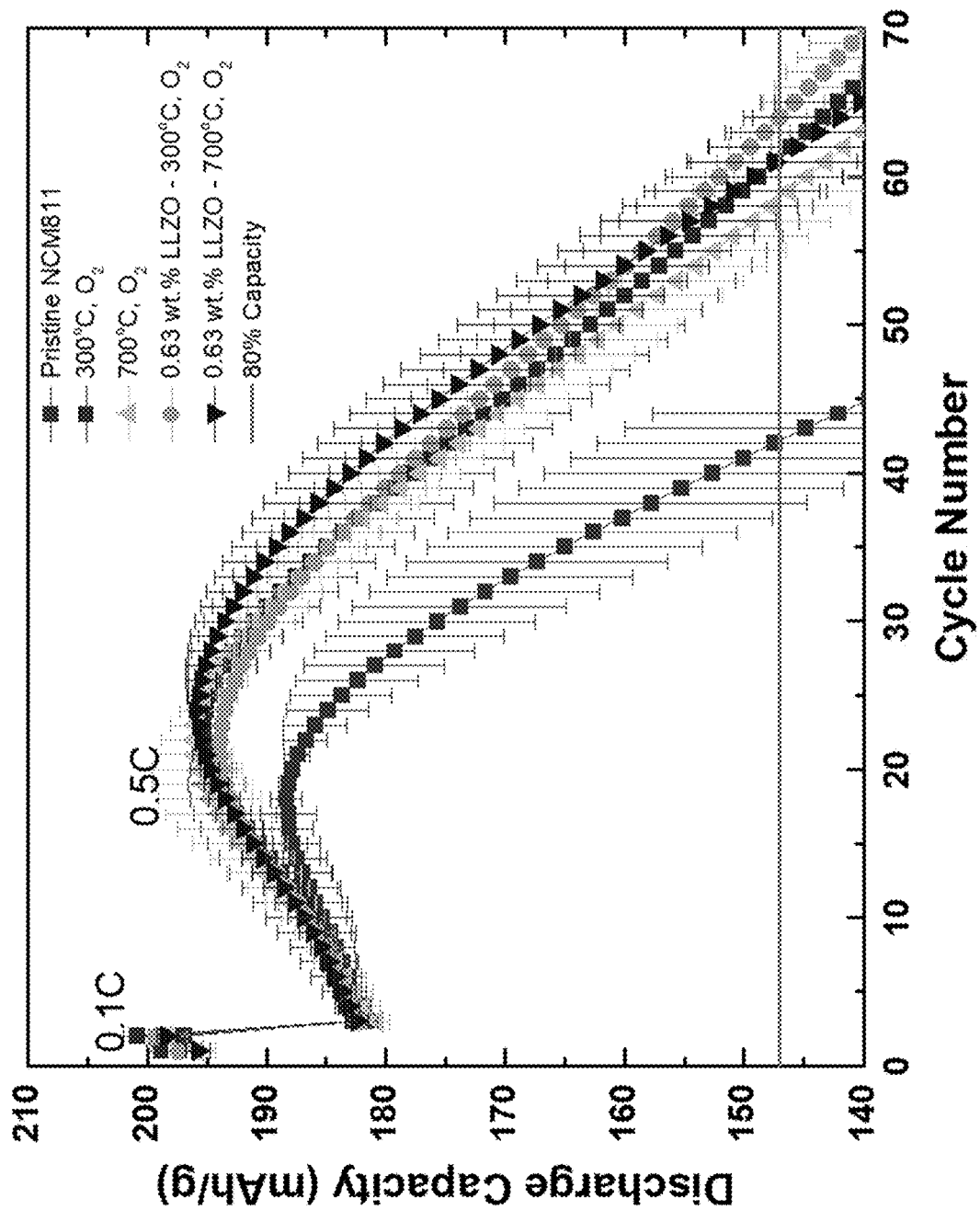
FIG. 9 shows the electrochemical cycling stability for pristine, heat treated, and LLZO-coated NMC811 materials. The data was collected in half-cells with lithium metal anodes using the following conditions: laminate formulation of 93/4/3 (active/carbon/binder), 1 C=200 mA/g, commercial electrolyte, and potential window of 3.0-4.3V at 30° C.

Compared to pristine NMC811 as shown in FIG. 8 and FIG. 9, 0.63 wt % LLZO coating applied via ball milling and calcined at 300° C. and 700° C. show improved electrochemical performance with capacities of 192-195 mAh/g despite having the same capacity at the beginning of the rate test.

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method, comprising:
    dry mixing, by ball-milling, a nickel rich lithium metal oxide cathode material with a doped LLZO powder until the nickel rich lithium metal oxide cathode material has a particle size of at least 6 microns and equal to or less than 15 microns, wherein the LLZO consisting of primary particles between 200 nanometers to 1 micrometer in size, forming a LLZO-cathode material mixture of 90-99.9 wt % nickel rich lithium metal oxide cathode material and 0.1 to 10 wt % doped LLZO powder; and
    calcining the dry LLZO-cathode material mixture between 300° C. and 700° C. for 1-10 hours under a flowing oxygen atmosphere.

2. The method of claim 1, wherein the doped LLZO powder comprises aluminum, tantalum, yttrium, iron, tellurium, tungsten, niobium, barium, cerium, titanium, boron, antimony, or gallium as a dopant which replaces 3-50 mol % of Li or Zr in $Li_7La_3Zr_2O_{12}$.

3. The method of claim 1, wherein the nickel rich lithium metal oxide cathode material comprises $LiNi_xCo_yMn_zO_2$ material, where x+y+z=1, further wherein x≥0.6.

4. The method of claim 1, wherein mixing is at 50-300 RPM for 5-90 minutes.

5. An electrochemical cell comprising the LLZO coated lithium nickel oxide of claim 1 as the cathode material.

6. A method, comprising:
   forming a doped cubic LLZO powder by flame spray pyrolysis;
   dry ball-milling a nickel rich lithium metal oxide cathode material until the nickel rich lithium metal oxide cathode material has a particle size of at least 6 microns and equal to or less than 15 microns with the doped LLZO powder comprising $Li_7La_3Zr_2O_{12}$ with 3-50 mol % of one or both of Li and Zr replaced with an aluminum dopant, wherein the LLZO consisting of primary particles between 200 nanometers to 1 micrometer in size;
   forming a dry LLZO-cathode material mixture of 90-99.9 wt % nickel rich lithium metal oxide cathode material and 0.1 to 10 wt % doped LLZO powder; and
   calcining the dry LLZO-cathode material mixture between 300° C. and 700° C. for 1-10 hours under a flowing oxygen atmosphere.

7. The method of claim 6, wherein the nickel rich lithium metal oxide cathode material comprises $LiNi_xCo_yMn_zO_2$ material, further wherein x+y+z=1.

8. The method of claim 7, wherein x≥0.6.

9. The method of claim 6, wherein mixing is by a ball milling process at 50-300 RPM for 5-90 minutes.

10. The method of claim 2, wherein the dopant is aluminum.

\* \* \* \* \*